United States Patent
Ruhland et al.

(10) Patent No.: US 8,833,060 B2
(45) Date of Patent: Sep. 16, 2014

(54) METHOD FOR OPERATING A SPARK-IGNITION INTERNAL COMBUSTION ENGINE WITH EXHAUST GAS AFTERTREATMENT

(75) Inventors: Helmut Hans Ruhland, Eschweiler (DE); Moritz Klaus Springer, Hagen (DE); Brendan Patrick Carberry, Aachen (GB)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 13/402,797

(22) Filed: Feb. 22, 2012

(65) Prior Publication Data

US 2012/0210699 A1 Aug. 23, 2012

(30) Foreign Application Priority Data

Feb. 22, 2011 (DE) .................. 10 2011 004 522

(51) Int. Cl.
| | | |
|---|---|---|
| F01N 3/00 | (2006.01) | |
| F01N 3/10 | (2006.01) | |
| F01N 3/02 | (2006.01) | |
| F01N 9/00 | (2006.01) | |
| F02D 37/02 | (2006.01) | |
| F01N 3/023 | (2006.01) | |
| F02D 41/02 | (2006.01) | |
| F02D 41/14 | (2006.01) | |
| F02D 41/40 | (2006.01) | |
| F02D 41/00 | (2006.01) | |

(52) U.S. Cl.
CPC ................. *F01N 9/002* (2013.01); *Y02T 10/47* (2013.01); *Y02T 10/22* (2013.01); *F01N 2430/06* (2013.01); *F02D 37/02* (2013.01); *F01N 3/023* (2013.01); *F02D 41/0245* (2013.01); *F02D 41/1448* (2013.01); *Y02T 10/44* (2013.01); *F02D 41/405* (2013.01); *F02D 2200/0812* (2013.01); *F02D 41/029* (2013.01); *F01N 3/101* (2013.01); *Y02T 10/26* (2013.01); *F02D 41/0055* (2013.01)

USPC .................. 60/295; 60/274; 60/285; 60/297; 60/299; 60/311

(58) Field of Classification Search
CPC ......... F01N 3/023; F01N 3/101; F01N 9/002; F01N 2430/06; F02D 37/02; F02D 41/0245; F02D 41/029; Y02T 10/22; Y02T 10/46; Y02T 10/47
USPC ............ 60/274, 285, 295, 297, 299, 301, 311
See application file for complete search history.

(56) References Cited

U.S. PATENT DOCUMENTS

| | | | |
|---|---|---|---|
| 2005/0022505 A1* | 2/2005 | Kitahara ......................... | 60/274 |
| 2010/0011749 A1 | 1/2010 | | |
| 2010/0192543 A1* | 8/2010 | Fujiwara et al. ................ | 60/276 |
| 2010/0236222 A1 | 9/2010 | Gomez | |
| 2011/0167802 A1 | 7/2011 | Brück | |

FOREIGN PATENT DOCUMENTS

DE 102009002198 A1 10/2010

* cited by examiner

*Primary Examiner* — Kenneth Bomberg
*Assistant Examiner* — Audrey K Bradley
(74) *Attorney, Agent, or Firm* — Julia Voutyras; Alleman Hall McCoy Russell & Tuttle LLP

(57) ABSTRACT

Embodiments for regenerating a particle filter are provided. In one example, a method includes operating a spark-ignition internal combustion engine having a particle filter for collecting and burning soot particles in exhaust gas comprises in order to initiate regeneration of the particle filter. The method may include, in response to a regeneration condition, increasing exhaust temperature by retarding spark timing and once regeneration is reached, operating the engine with lean combustion to regenerate the particle filter, where a degree of leanness is based on each of a state of the filter and an upstream three-way catalyst.

7 Claims, 2 Drawing Sheets

METHOD FOR OPERATING A SPARK-IGNITION INTERNAL COMBUSTION ENGINE WITH EXHAUST GAS AFTERTREATMENT

RELATED APPLICATIONS

The present application claims priority to German Patent Application No. 102011004522.8, filed on Feb. 22, 2011, the entire contents of which are hereby incorporated by reference for all purposes.

FIELD

The disclosure relates to a method for operating a spark-ignition internal combustion engine having at least one cylinder and at least one exhaust line for discharging the exhaust gases from the at least one cylinder, in which internal combustion engine at least one system for exhaust gas aftertreatment is provided in the at least one exhaust line.

BACKGROUND AND SUMMARY

Spark-ignition internal combustion engines, i.e. Otto-cycle engines, are equipped with various exhaust gas aftertreatment systems in order to reduce the pollutant emissions. Even without additional measures, oxidation of the unburned hydrocarbons (HC) and of carbon monoxide (CO) duly takes place during the expansion and discharge of the cylinder charge at a sufficiently high temperature level and in the presence of sufficiently large oxygen quantities. However, due to the exhaust gas temperature which decreases rapidly in the downstream direction, and the consequently rapidly decreasing rate of reaction, said reactions are quickly halted.

For these reasons, use is made of catalytic reactors which, through the use of catalytic materials which increase the rate of certain reactions, ensure oxidation of HC and CO even at low temperatures. If nitrogen oxides are additionally to be reduced, this may be achieved through the use of a three-way catalytic converter, which, however, for this purpose utilizes stoichiometric operation ($\lambda \approx 1$) of the Otto-cycle engine within narrow limits Here, the nitrogen oxides $NO_x$ are reduced by means of the non-oxidized exhaust gas components which are present, specifically the carbon monoxides and the unburned hydrocarbons, wherein said exhaust gas components are oxidized at the same time.

In the case of internal combustion engines which are operated with a high excess of air, i.e., for example, Otto-cycle engines operating in the lean mode, but also direct injection Otto-cycle engines, the nitrogen oxides in the exhaust gas in principle cannot be reduced, i.e. because of the lack of reducing agents. For effective exhaust gas aftertreatment, the working methods described above would require the use of exhaust gas aftertreatment systems which are used in diesel engines which, in principle, are operated with a high excess of air. In order to oxidize the unburned hydrocarbons (HC) and carbon monoxide (CO), oxidation catalytic converters would have to be provided in the exhaust system. In order to reduce the nitrogen oxides, use could be made of selective catalytic converters, in which reducing agent is introduced in a targeted manner into the exhaust gas in order to selectively reduce the nitrogen oxides. The nitrogen oxide emissions could also be reduced with a nitrogen-oxide storage catalytic converter, in which the nitrogen oxides are initially absorbed in the catalytic converter during a lean mode of the internal combustion engine, i.e. are collected and stored, in order then to be reduced when oxygen is deficient during a regeneration phase.

Particle emissions were originally considered only to be a problem in diesel engines.

However, these soot emissions even of spark-ignition internal combustion engines have increasingly become the focal point of the legislature.

In order to keep to future limit values for pollutant emissions, in particular soot emissions, additional measures are therefore necessary, requiring spark-ignition internal combustion engines to be equipped with a particle filter.

"Regenerative particle filters" are already used in diesel engines to minimize the emission of soot particles. In this case, the soot particles are filtered out of the exhaust gas, stored and intermittently burned during regeneration of the filter. In order to oxidize the soot in the filter, oxygen or an excess of air is required in the exhaust gas, and this can be achieved, for example, by a superstoichiometric operation ($\lambda > 1$) of the internal combustion engine.

Diesel engines and spark-ignition internal combustion engines differ considerably in respect of the working methods. In contrast to diesel engines which, in principle, are operated with a high excess of air ($\lambda \gg 1$), Otto-cycle engines are generally equipped with a three-way catalytic converter which—as explained above—utilizes stoichiometric operation within narrow limits In the case of the Otto-cycle engine, the use of a particle filter therefore requires a concept with which the oxygen required for regenerating the filter is provided, whereas, in the case of the diesel engine, an excess of air is in any case present in the exhaust gas because of the working method.

The high temperatures required for regenerating the particle filter, for example $T_{Reg} \sim 550°$ C., when catalytic support is not present, are sufficiently frequently achieved in a spark-ignition internal combustion engine, even during normal operation, because of the high exhaust gas temperatures in comparison to the diesel engine.

Nevertheless, the filter has also to be able to be regenerated in a targeted manner if the current loading of the filter requires this. This is because, depending on the driving behavior of the particular driver, i.e. the manner in which the internal combustion engine is operated, it is no longer possible to assume that the conditions required for regeneration are readily achieved sufficiently frequently during operation, i.e. without assistance. For example, in the case of vehicles which are used only for short distances and which require a large number of cold starts, the filter may be critically loaded, since the conditions required for regeneration do not occur during operation. Additional measures therefore have to be resorted to in order to ensure regeneration of the filter.

The inventors herein have recognized the issues with the above approaches and herein offer a method to at least partly address them. In one embodiment, a method for operating a spark-ignition internal combustion engine having a particle filter for collecting and burning soot particles in exhaust gas, comprises, in order to initiate regeneration of the particle filter, increasing a particle filter temperature $T_{filter}$ to such an extent that $T^{filter} \geq T_{Reg}$, wherein $T_{Reg}$ is a predefinable minimum regeneration temperature, and operating the internal combustion engine superstoichiometrically ($\lambda > 1$).

According to the disclosure, the filter temperature $T_{filter}$ is raised in a targeted manner for the purpose of cleaning the filter so as to provide the conditions for regeneration of the filter. In addition, the oxygen required for the oxidation of the particles collected in the filter is provided by the internal combustion engine being operated superstoichiometrically ($\lambda$>1), i.e. also being transferred into the superstoichiometric mode if the internal combustion engine was operated substoichiometrically or stoichiometrically previously.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description.

It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
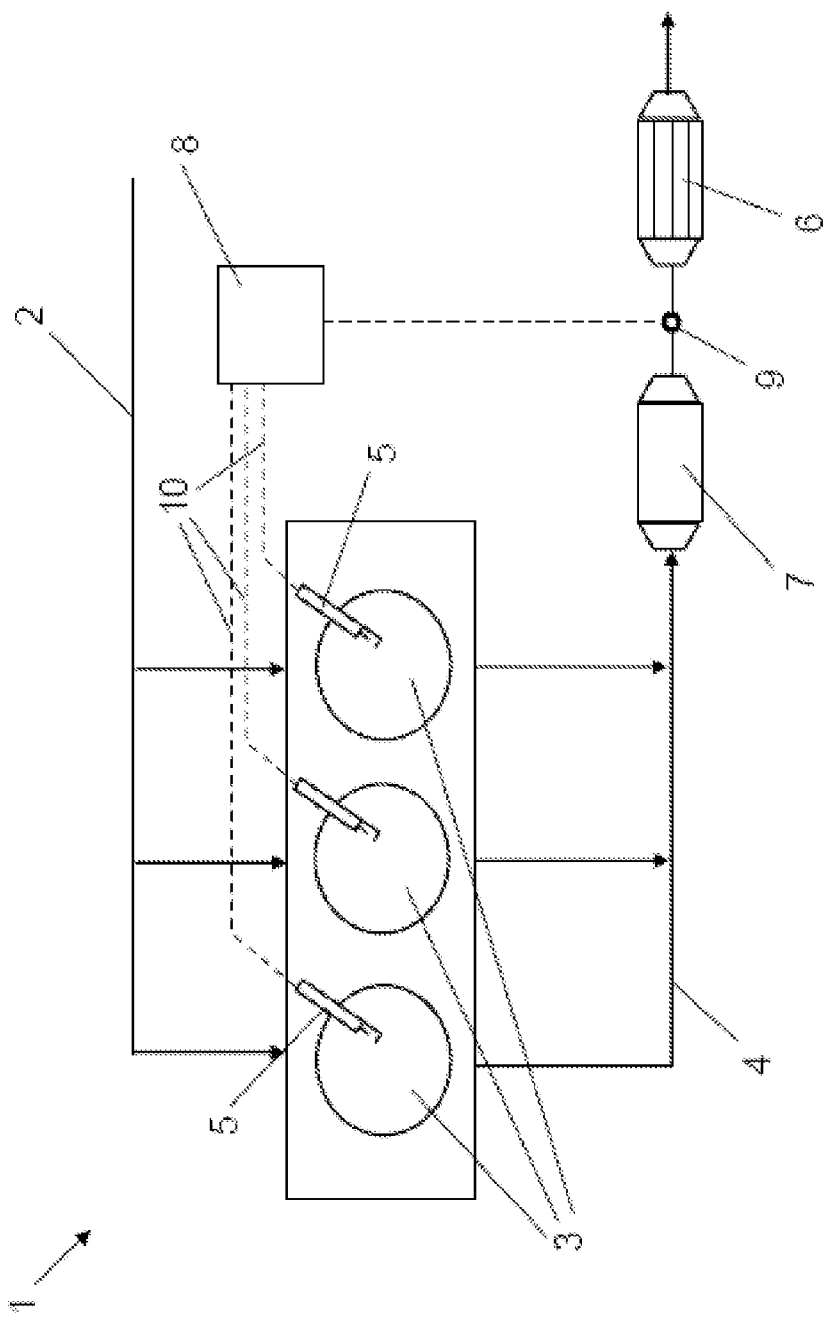
FIG. 1 shows schematically a first embodiment of the internal combustion engine.

While gasoline engines typically produce low amounts of particulate matter, increasing stringency of emission limits has resulted in the inclusion of particulate filters in the exhaust systems of these engines. During certain operating conditions of the gasoline engine, the particle filter may undergo a regeneration event without specific regeneration commands. However, if the engine has been operated with a high number of cold starts, or frequently travels short distances, regeneration of the particulate filter may be indicated and the engine may be operated with increased exhaust temperature and under lean combustion conditions in order to regenerate the filter.

If the internal combustion engine, according to an example embodiment, has a three-way catalytic converter arranged in the at least one exhaust line, there is preferably only slight lean running, in order, even during the filter regeneration, to ensure the air ratio required for converting the pollutants in the three-way catalytic converter.

For the reasons mentioned above, embodiments of the method are advantageous, in which the internal combustion engine is operated with an air ratio $\lambda \leq 1.15$ in order to regenerate the particle filter. Embodiments of the method are particularly advantageous, in which the internal combustion engine is operated with an air ratio $\lambda \leq 1.1$, possibly with an air ratio $\lambda \leq 1.05$, in order to regenerate the particle filter. However, in some embodiments, the internal combustion engine may be operated with an air ratio $\lambda > 1.15$.

Embodiments of the method are advantageous, in which the filter regeneration is initiated if the current loading of the filter is greater than a predefinable loading of the filter. Embodiments are advantageous here, in which the filter regeneration is initiated only if the current loading of the filter is greater than the nominal maximum loading of the filter, i.e. if the filter is overloaded.

The two method alternatives mentioned above ensure regeneration as required. The particles collected in the filter are oxidized only if this is actually necessary. Account is therefore taken of the fact that the internal combustion engine generally cannot be operated optimally, i.e. is not optimized in terms of efficiency, during the regeneration, which basically should be considered to be disadvantageous.

In this connection, embodiments of the method are advantageous, in which the current loading of the filter is estimated by means of mathematical models.

Advantageous embodiments of the method include those in which the current loading of the filter is estimated using the exhaust gas counterpressure upstream of the filter.

The exhaust gas counterpressure which arises as a consequence of the increasing flow resistance of the filter due to the accumulating particle mass in the filter can be detected by measuring by a sensor, or it can be estimated in turn by mathematical models.

The determination of the exhaust gas counterpressure upstream of the filter can also be founded, i.e. based, on an exhaust gas pressure determined at a different location in the exhaust tract. In this manner, pressure sensors which are already present can be used under some circumstances, even if said pressure sensors are not arranged directly upstream of the filter.

Embodiments of the method are also advantageous, in which the filter regeneration is initiated when a predefined mileage is reached. According to this alternative, the filter is generally cleaned, namely always after a fixedly predefined distance has been covered, without the actual loading of the filter being taken into consideration. This procedure is advantageous if the legislature regulates the filter regeneration to the effect that the number of permitted cleaning operations is predefined with regard to a reference distance, for example five thousand kilometers.

Embodiments of the method are also advantageous, in which the filter regeneration is initiated when a predefined operating period is reached.

In contrast to the method alternative described above, in the present case rather than detecting the travel distance, i.e. the distance covered, the duration of time (e.g., the time interval) over which the internal combustion engine has been operated since the last regeneration is measured and accumulated. Even in this procedure, the actual loading of the filter is not taken into consideration, and neither is the manner of operation, and in particular whether the internal combustion engine undergoes a large number of cold starts, predominantly in city traffic, or else is used, i.e. operated, for long distances.

Embodiments of the method are therefore also advantageous, in which the filter regeneration is initiated when a predefinable number $n_{cold}$ of cold starts or a predefined number of acceleration phases is reached. This method alternative also does not strictly follow the principle of filter regeneration when required in the sense that the actual loading of the filter is taken into consideration and used as a crucial criterion for initiating regeneration. However, in contrast to the two previous method alternatives, the loading of the filter is taken into consideration to the extent that the manner of operation of the internal combustion engine, namely the number $n_{cold}$ of cold starts, is monitored, and the starting point is the assumption that the filter could require or requires cleaning after a certain number $n_{cold}$ of cold starts.

Embodiments of the method are also advantageous, in which, in order to increase the filter temperature $T_{filter}$, the exhaust gas temperature $T_{exhg}$ is increased, the increase in the exhaust gas temperature $T_{exhg}$ being obtained by at least one engine-internal measure. Engine-internal measures can be used for heating exhaust gas aftertreatment systems arranged in the exhaust system, in particular a three-way catalytic converter and/or the particle filter.

Embodiments of the method are also advantageous, in which the exhaust gas temperature $T_{exhg}$ is increased by adjustment of the ignition point to retarded. The combustion process proceeding in the cylinder is therefore likewise displaced to retarded, i.e. in the direction of charge exchange, as a result of which the admission of heat to the exhaust system or to the exhaust gas is increased and therefore the exhaust gas temperature is increased.

Embodiments of the method are also advantageous, in which the exhaust gas temperature $T_{exhg}$ is increased by at least one post-injection of fuel into the at least one cylinder. The particle filter can be heated by post-injection of additional fuel into the combustion chamber, wherein the post-injected fuel is ignited actually in the combustion chamber, which can be carried out by the main combustion as it comes to an end or by the high temperatures present in the combustion chamber towards the end of the combustion, and therefore the exhaust gas temperature of the exhaust gases discharged into the exhaust tract is raised in an engine-internal manner.

In conjunction with the post-injection, it has to be taken into consideration that the use of additional fuel for the purpose of heating the particle filter in principle has a disadvantageous effect on the efficiency of the internal combustion engine. In particular, the frequency with which the particle filter is regenerated, and the duration of the filter generation decisively and directly have an influence on the quantity of fuel used for these purposes and therefore on the overall consumption of the internal combustion engine.

As an alternative to the post-injection, the fuel may also be introduced directly into the exhaust tract upstream of the filter, wherein said fuel for heating the filter is burned together with oxygen located in the exhaust gas or air which is additionally introduced.

Alternatives of the method are also advantageous, in which the increase in the exhaust gas temperature is realized by recirculation of exhaust gas (EGR), wherein the exhaust gas recirculation in the context of the present disclosure is regarded to be an engine-internal measure. The hot exhaust gases recycled into the combustion chamber increase the temperature of the fresh charge of the cylinder. In addition, as a result of the composition of the mixture, the combustion rate is reduced, and therefore the combustion process is extended and reaches as far as or into the charge exchange.

Embodiments of the method may also be advantageous, in which the particle filter is equipped with a heater and said heater is activated in order to increase the filter temperature $T_{filter}$.

A spark-ignition internal combustion engine for carrying out a method of a previously mentioned type, is achieved by a spark-ignition internal combustion engine having at least one cylinder and at least one exhaust line for discharging the exhaust gases from the at least one cylinder, in which internal combustion engine a three-way catalytic converter for exhaust gas aftertreatment and a particle filter for collecting and burning the soot particles in the exhaust gas are provided in the at least one exhaust line.

That which has been stated regarding the method according to the disclosure applies analogously to the internal combustion engine according to the disclosure, and therefore reference is made to that which has been stated in conjunction with the method.

The combination of three-way catalytic converter and particle filter permits complete aftertreatment of the exhaust gas, namely of the unburned hydrocarbons (HC), the carbon monoxide (CO), the nitrogen oxides ($NO_x$) and the soot particles.

The two components of the exhaust gas aftertreatment can be designed as separate components. Dedicated carrier substrates can be provided both for the three-way catalytic converter and for the particle filter. The two carrier substrates here are either formed spaced apart from each other or joined together, and the three-way catalytic converter is preferably arranged upstream of the particle filter. This arrangement is favorable since it has to be taken into consideration that, following a cold start, the three-way catalytic convertor should be heated up as rapidly as possible whereas the particle filter, for carrying out the function thereof, utilizes high temperatures only for the regeneration which is carried out comparatively rarely.

As an alternative, use may be made of a combined exhaust gas aftertreatment system in which the three-way catalytic convertor and the particle filter are designed as an integral component, i.e. as a four-way catalytic converter.

For the reasons mentioned above, embodiments of the internal combustion engine, in which the three-way catalytic convertor is arranged upstream of the particle filter, and of internal combustion engines, in which the three-way catalytic converter and the particle filter form an integral component, are therefore advantageous.

FIG. 1 shows schematically an embodiment of the spark-ignition internal combustion engine 1 for carrying out a method for regenerating a particle filter, which will be described in more detail with regard to FIG. 2 below. A three-cylinder in-line engine 1 is depicted, in which the three cylinders 3 are arranged along the longitudinal axis of the cylinder head, i.e. in line, and are each equipped with a spark plug 5 for initiating the spark ignition. The spark plugs 5 are activated, i.e. controlled, individually by an engine controller 8 via a control line 10. The air ratio 2 is set via the quantity of fuel injected (not illustrated).

A suction line 2 is provided in order to supply the cylinders 3 with fresh air or a fresh mixture. An exhaust line 4 serves to discharge the hot combustion gases. A three-way catalytic converter 7 for the exhaust gas aftertreatment and a particle filter 6 for collecting the soot particles in the exhaust gas are provided in the exhaust line 4, wherein the three-way catalytic converter 7 is arranged upstream of the particle filter 6 and therefore in the vicinity of the engine.

In order to initiate the regeneration of the particle filter 6, the filter temperature $T_{filter}$ is increased to the required regeneration temperature $T_{Reg}$ by the ignition point being adjusted to retarded by the engine controller 8. In addition, the internal combustion engine is transferred, if necessary, into superstoichiometric operation ($\lambda > 1$).

The filter regeneration may be initiated if the current loading of the filter 6 makes this necessary, i.e. the loading is greater than a predefined loading, and therefore regeneration is ensured. The current loading of the filter 6 can be estimated using the exhaust gas counterpressure which arises upstream of the filter 6 as a consequence of the accumulating particle mass in the filter 6. In the present case, the exhaust gas counterpressure is detected by measuring by a pressure sensor 9.

However, in some embodiments, the filter regeneration may be initiated if engine operating parameters indicate a regeneration condition. These parameters may include the engine operating for a predetermined duration, such as 100 hours or 5000 km, or may include the engine operating with over a threshold number of cold engine starts since a previous regeneration, such as over 30 cold starts.

Figure 2:
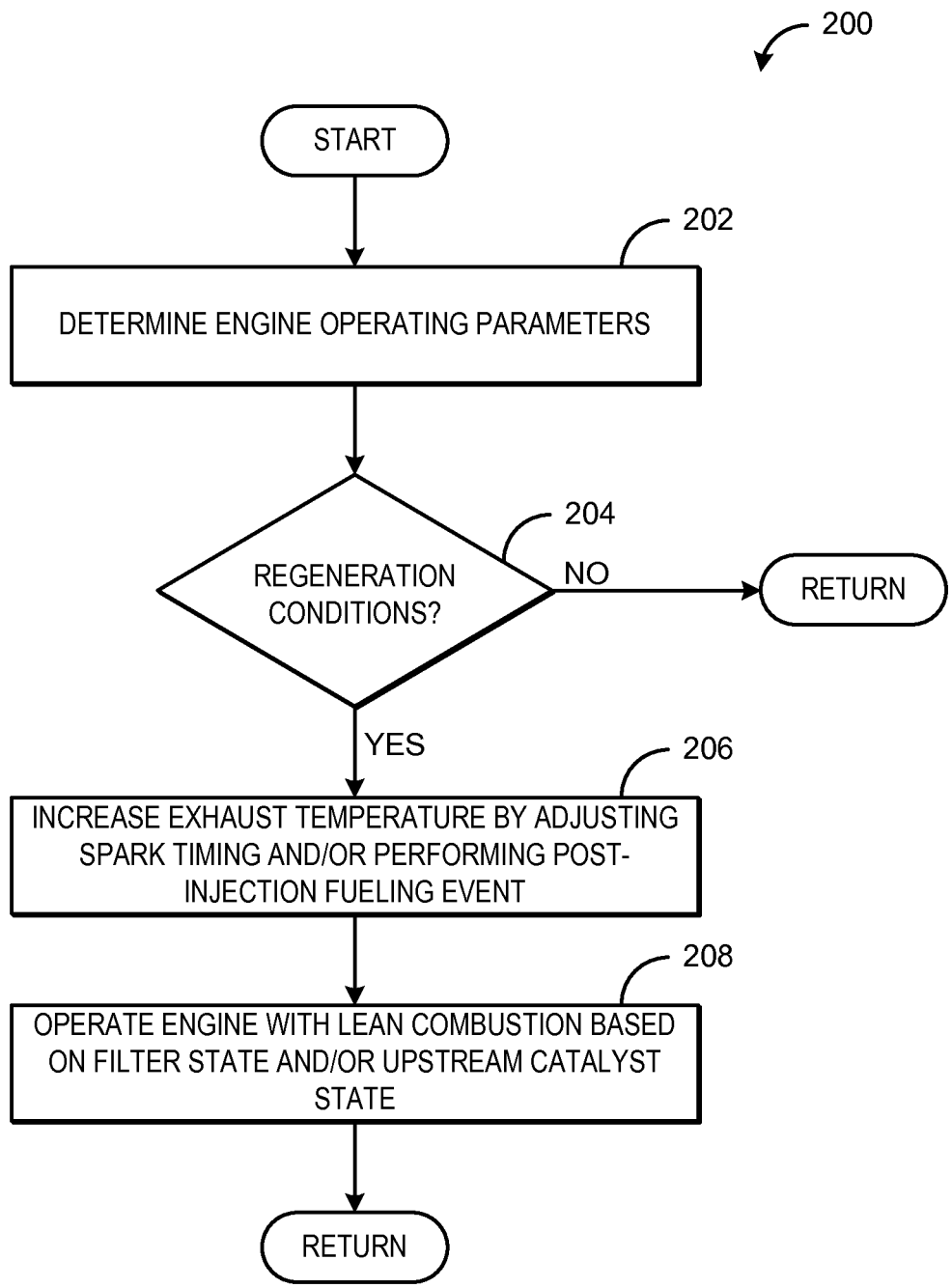
FIG. 2 shows a flow chart illustrating a method for regenerating a particle filter according to an embodiment of the present disclosure.

Turning to FIG. 2, a method 200 for regenerating a particle filter is provided. Method 200 may be carried out according to instructions stored in the memory of an engine controller, such as controller 8 of FIG. 1. At 202, method 200 comprises determining engine operating parameters. Engine operating parameters may include parameters regarding a filter regeneration condition, such as duration and/or distance engine has been operated since a previous regeneration, number of cold engine starts since a regeneration, exhaust backpressure upstream of the filter, etc. The engine operating parameters may also include current engine speed, load, ignition timing, air/fuel ratio, etc.

At 204, it is determined if the engine is in a particle filter regeneration condition. The particle filter regeneration condition may be a suitable engine condition that indicates a regeneration of the particle filter is to be initiated. The regeneration condition may include engine operation duration and/or distance greater than a threshold, exhaust backpressure above a threshold, number of cold engine starts greater than a threshold, etc. The regeneration conditions may also include engine temperature being above a threshold (e.g., not during a cold start), or may include the engine not operating under a commanded rich operation.

If it is determined at 204 that the engine is not in a regeneration condition, method 200 returns. If a regeneration condition is indicated, method 200 proceeds to 206 to increase exhaust temperature. The exhaust temperature may be increased by adjusting spark timing, such as retarding spark timing, and/or by a post-injection fueling event. However, other mechanisms of heating the exhaust are also within the scope of this disclosure, such as with a heater upstream of the particle filter. At 208, the engine is operated with lean combustion. Lean combustion may include reducing a fuel injection amount, opening a throttle to increase intake flow, adjusting an EGR amount in the cylinder, etc. A degree of leanness of the combustion may be based on a state of the particulate filter and/or based on a state of a three-way catalyst upstream of the filter. For example, an oxygen storage amount of the three-way catalyst may be determined, and the leanness of the air-fuel ratio based at least in part on the oxygen storage capacity of the catalyst. Similarly, the leanness of combustion may be based on an amount of particulate in the filter to be regenerated. By increasing exhaust temperature and increasing the oxygen concentration of the exhaust, the particle filter may be heated to a sufficient temperature to initiate and carry out particle filter regeneration. Upon regenerating the filter, method 200 returns.

Thus, method 200 of FIG. 2 provides for a method for regenerating a particle filter. The method may include, in response to a regeneration condition, increasing exhaust temperature by adjusting spark timing, and once regeneration is reached, operating the engine with lean combustion to regenerate the particle filter, where a degree of leanness is based on each of a state of the filter and an upstream three-way catalyst. In another embodiment, the method may include, in response to a regeneration condition, operating the engine with lean combustion and performing a post-injection fueling event in order to regenerate the particle filter, where a degree of leanness and an amount of the post-injection are each based on each of an instantaneous amount of oxygen stored in the three-way catalyst and an instantaneous amount of particulate being reacted in the filter due to the regeneration.

In one example, the degree of leanness may be based on the state of the regeneration of the filter, the filter operating conditions, as well as a state of the three way catalyst. For example, the three-way catalyst may be able to store a maximum amount of oxygen during a lean condition, after which substantial oxygen breakthrough occurs. At the same time, excess oxygen in the lean condition is needed to react with the soot being regenerated in the filter. As such, the degree of leanness may be regulated to not only take into account the oxygen storage state of the three-way catalyst, but also the soot storage level of the particulate filter as well as the reaction rate (e.g., the rate of soot oxidation) in the filter during regeneration. In other words, a desired amount of oxygen delivery rate to the filter may be determined based on filter temperature in order to obtain a desired reaction rate of soot that is high enough to sustain filter regeneration temperature, but not too much as to cause filter over-temperature conditions. Then, from the desired amount of oxygen to be delivered to the filter, a desired lean exhaust air-fuel ratio may be determined based on the oxygen storage level of the three-way catalyst, for example, based on the relative fullness of the oxygen storage in the three-way catalyst.

At lower three-way catalyst storage levels, a greater degree of leanness for a given desired level of oxygen delivery to the filter is selected as more of the excess oxygen in the exhaust gas is retained by the three-way catalyst, and vice versa. For example, as more of the exhaust gas excess oxygen breaks through the three-way catalyst, the leanness can be lowered (e.g., the air-fuel ratio can be ramped toward stoichiometry) to provide a given desired level of oxygen to the filter. Likewise, if a higher oxygen delivery rate to the filter is requested, a greater increase in the leanness degree is provided at lower oxygen storage levels of the three-way catalyst as compared to higher oxygen storage levels of the three-way catalyst, again to account for the different degrees to which oxygen is retained by the three-way catalyst. Similarly, changes in temperature of the three-way catalyst may change the total oxygen storage capacity, and thus change the relative degree of oxygen storage for a given instance. As such, the method may adjust the degree of leanness based on the instantaneous levels of oxygen storage of the three-way catalyst, maximum oxygen storage of the three-way catalyst, and the desired oxygen delivery rate to the filter based on filter operating conditions. For example, as temperatures in the three-way catalyst rise as filter regeneration progresses, the oxygen storage capacity of the three-way catalyst may first increase at the beginning of regeneration, and then decrease as temperature continue to rise.

In this way, the degree of leanness of the exhaust gas can be adjusted to compensate for this affect, while still delivering the desired amount of oxygen to the particulate filter. For example, to provide a given level of oxygen delivery to the filter, the degree of leanness may be first increased to account for the greater amount of oxygen retained by the three-way catalyst, and then decreased as the temperature surpasses the maximum oxygen storage level temperature to account for oxygen that will be released by the three-way catalyst.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine particle filter, comprising:
configuring an engine controller to increase exhaust temperature by retarding spark timing in response to a regeneration condition and once regeneration is reached, operate the engine with lean combustion to regenerate the particle filter, where a degree of leanness is based on each of a state of the filter and an upstream three-way catalyst, the degree of leanness further based on each of an instantaneous amount of oxygen stored in the upstream three-way catalyst and an instantaneous amount of particulate being reacted in the particle filter due to the regeneration.

2. The method of claim 1, wherein the regeneration condition comprises exhaust backpressure greater than a threshold.

3. The method of claim 1, wherein the regeneration condition comprises a greater than threshold number of cold engine starts since a previous regeneration.

4. The method of claim 1, further comprising increasing a particle filter temperature $T_{filter}$ to such an extent that $T_{filter} \geq T_{Reg}$, wherein $T_{Reg}$ is a predefinable minimum regeneration temperature, and operating the engine superstoichiometrically ($\lambda > 1$).

5. The method of claim 1, wherein the engine is operated with an air ratio $\lambda \leq 1.15$ in response to the regeneration condition.

6. The method of claim 1, wherein the engine is operated with an air ratio $\lambda \leq 1.1$ in response to the regeneration condition.

7. The method of claim 1, wherein the upstream three-way catalyst and the particle filter form an integral component.

* * * * *